United States Patent [19]
Fujii et al.

[11] 3,890,374
[45] June 17, 1975

[54] METHOD FOR THE PREPARATION OF MONOMETHYL TEREPHTHALATE OR A MIXTURE THEREOF WITH P-TOLUIC ACID

[75] Inventors: Takao Fujii; Tomio Harada; Koshi Namie; Shinichi Takeda, all of Matsuyama, Japan

[73] Assignee: Teijin Hercules Chemical Co., Ltd., Tokyo, Japan

[22] Filed: Mar. 6, 1973

[21] Appl. No.: 338,421

[30] Foreign Application Priority Data
Mar. 7, 1972    Japan.................................. 47-23436

[52] U.S. Cl............................. 260/475 R; 260/524 R
[51] Int. Cl.............................................. C07c 69/82
[58] Field of Search ..................... 260/475 R, 475 B

[56] References Cited
UNITED STATES PATENTS
2,880,237   3/1959   Knobloch............................ 260/475
3,060,222   10/1962  Keller et al. ........................ 260/475

FOREIGN PATENTS OR APPLICATIONS
1,114,472   10/1961  Germany ............................ 260/475
556,328     4/1958   Canada................................ 260/475
2,144,920   4/1972   Germany ............................ 260/475
2,010,137   9/1971   Germany ............................ 260/475
46-6412     2/1971   Japan................................... 260/475

Primary Examiner—Lorraine A. Weinberger
Assistant Examiner—E. Jane Skelly
Attorney, Agent, or Firm—Sherman and Shalloway

[57]    ABSTRACT

In the preparation of monomethyl terephthalate or a mixture thereof with p-toluic acid through liquid phase oxidation of methyl p-toluate or a mixture of methyl p-toluate with p-xylene with molecular oxygen, an improved method whereby the oxidation reaction is performed at 160°–250°C., in the presence of a catalyst system comprising (A) nickel metal or a nickel compound, and (B) managanese metal or a manganese compound. This method achieves, in comparison with the conventional practices using cobalt compounds as the catalyst, preparation of less colored monomethyl terephthalate at greater reaction rates and higher yields.

8 Claims, No Drawings

METHOD FOR THE PREPARATION OF MONOMETHYL TEREPHTHALATE OR A MIXTURE THEREOF WITH P-TOLUIC ACID

This invention relates to a method for the preparation of monomethyl terephthalate (hereinafter to be abbreviated as MMT) or a mixture of MMT with p-toluic acid (PTA), by oxidizing methyl p-toluate (MPT) or a mixture of MPT with p-xylene (PX), in liquid phase, with molecular oxygen or a molecular oxygen-containing gas. More particularly, the invention is characterized by the combined use of (A) nickel metal and/or a nickel compound and (B) manganese metal and/or a manganese compound, as the oxidation catalyst.

Dimethyl terephthalate (DMT) is a compound valuable as a starting material for the preparation of fiber- and film-forming polyesters, and is being produced on large industrial scales.

While a great number of methods are known for the preparation of DMT, industrially the SD process and Witten process described below are the two most widely employed.

According to the SD process, PX is oxidized with a molecular oxygen-containing gas, in the presence of a heavy metal catalyst and a bromine compound as the promotor, in a lower aliphatic acid solvent such as acetic acid, to form terephthalic acid (TA), and the TA is further esterified with methanol to produce DMT. (see, for example, U.S. Pat. No. 2,833,816.).

Thus TA can be prepared by the SD process by a single-stage oxidation of PX, but the bromine compound used as the promotor and acetic acid used as the solvent are heavily corrosive, and therefore the apparatus is necessarily made of such expensive materials as titanium and still shows a short life. Furthermore large quantities of acetic acid as the solvent is required, and because TA is insoluble in acetic acid and also is itself non-meltable, the slurry and solid must be handled in the process. Besides those many industrial drawbacks, it is difficult to refine the TA.

Another widely practiced process is referred to as Witten process, in which PX is oxidized with a molecular oxygen-containing gas in liquid phase, in the presence of a heavy metal catalyst to form PTA, which is esterified with methanol to form MPT, the MPT is again liquid phase-oxidized with a molecular oxygen-containing gas in the presence of a heavy metal catalyst to be converted to MMT, and the MMT is esterified with methanol to provide DMT. (See, for example, British Pat. No. 727,989.) According to this process, PX is subjected to reaction steps, oxidation (PTA), esterification (MPT), oxidation (MMT), and esterification (DMT). It has been also proposed to oxidize a mixture of PX and MPT, and subsequently to esterify the oxidation product. In this latter case, the mixture of PX and MPT is oxidized in liquid phase with a molecular oxygen-containing gas in the presence of a heavy metal catalyst, and the resulting mixture of PTA and MMT is esterified with methanol. DMT is recovered from the thus formed esterification product, and fresh PX is added to the remaining reaction mixture composed chiefly of MPT, which is then again oxidized to form MMT and PTA. (See, for example, British Pat. No. 809,730).

Heretofore, in the industrial practice of the above-described Witten process, cobalt compounds such as cobalt acetate or naphthenate are almost invariably used as the catalyst, according to the belief that the cobalt compounds as the heavy metal catalyst assist the preparation of high purity DMT at the highest yield.

Because the Witten process requires none of the halogen compounds such as bromine compounds or the lower aliphatic acids such as acetic acid, which are employed in the first-mentioned SD process, corrosion of equipment is substantially nil, and the equipment made of such cheap construction material as stainless steel exhibits sufficiently long life. Also the use of solvent is not required, and consequently handling of slurry and solid is unnecessary. Thus the Witten is highly advantageous.

The defect of the latter process resides in that, however, firstly the oxidation reaction rate is low, and accordingly the reactors of large capacities are required. Another defect is that the DMT yield from PX is low, because such by-products as carbon dioxide and monoxide, high temperature-boiling tar-like products, etc., are formed in large quantities during the oxidation of PX, MDT, or mixtures of PX with MPT, to reduce the yield of effective product convertible to DMT.

Still another defect common to the SD-process, Witten process, and many of other known methods for DMT preparation, is that colored or fluorescent impurities are formed during the oxidation reaction. Particularly the colored impurities are the most detrimental to the preparation of polyester from DMT. Presence of the impurities at the slightest concentration can appreciably impair the color tone of product polyester.

Accordingly, a primary object of the present invention is to provide a method for the preparation of color-free MMT or a mixture of MMT and PTA by oxidizing MPT or a mixture of MPT and PX with molecular oxygen, at a high reaction rate and yield.

The second object of the invention is to provide a method for the preparation of high purity MMT or a mixture of MMT and PTA by direct oxidation of MPT or a mixture of MPT and PX, with molecular oxygen, without using a promotor such as bromine or a bromine compound, or a lower aliphatic monocarboxylic acid solvent such as acetic acid, as in the afore-described SD process, at a high reaction rate and yield.

Still another object of the invention is to provide a method for the preparation of DMT from MPT through the steps of, when MPT alone is used as the starting material, esterifying the MMT obtained by the oxidation reaction with methanol to convert the same to DMT, and separating the DMT.

Furthermore, when a mixture of MPT with PX is used as the starting material, the invention provides a method for the preparation of DMT from PX, which comprises esterifying the mixture of MMT and PTA formed upon the oxidation with methanol to effect the conversion to a mixture of DMT and MPT, recovering the DMT, adding to the remaining reaction liquid containing MPT fresh PX and recycling the same to the oxidation reaction system.

A still additional object of the invention is to provide a method for recovering DMT or oxidation or esterification intermediate products thereof from the distillation residue remaining after the steps of oxidizing MPT or a mixture of MPT with PX as aforesaid, esterifying the so oxidized reaction mixture with methanol, and separating DMT from the esterified product by distillation.

Still other objects and advantages of the invention will become apparent from the following descriptions.

The foregoing objects and advantages are accomplished by the subject invention which comprises the preparaton of MMT or a mixture of MMT with PTA by oxidizing MPT or a mixture of MPT with PX, with molecular oxygen or a molecular oxygen-containing gas in liquid phase, the characteristic features residing in that the oxidation reaction is performed 1. in the presence of a catalyst comprising
   A. nickel metal and/or a nickel compound which is soluble in the reaction system (component A), and
   B. manganese metal and/or a manganese compound which is soluble in the reaction system (component B),
   the composition of the catalyst being such that the weight ratio of nickel metal to manganese metal becomes 95:5 to 0.5:99.5, when the components A and B are respectively converted to nickel metal and manganese metal,
2. at a temperature within the range of 160° to 250°C.

As the oxidation catalyst useful according to the Witten process, compounds of variable valence metals such as cobalt or manganese, which are soluble in the reaction system, including lower aliphatic acid salts thereof, e.g., acetate, and aromatic carboxylic acid salts thereof, e.g. toluate, are known. (See, for example, British Pat. Nos. 727,989 and 809,730.)

In practice, the catalyst almost exclusively employed in the past has been a cobalt compound, and only recently the concurrent use of a cobalt compound and a manganese compound was proposed. So far as we are aware, there is no literature, reporting an advantageous preparation of MMT or a mixture of MMT with PTA, using a catalyst other than the above-mentioned metallic compounds.

According to our studies, attempts to oxidize MPT or a mixture thereof with PX at 140°– 160°C., the temperature range normally employed for Witten process, using as the catalyst compounds of other variable valence metals such as chromium and nickel, either alone or in combination, failed to produce MMT or a mixture thereof with PTA at any industrially meaningful yield.

We have discovered that the concurrent use of a nickel compound and manganese compound as the catalyst for the oxidation of MPT or a mixture thereof with PX drastically increases the reaction rate over using a manganese compound or nickel compound alone. Additionally, it reduces the formation of by-products such as carbon dioxide and monoxide, and high temperature-boiling tar-like substances; increases the yield of the object product; and furthermore decreases the coloring of the oxidation product. We also discovered a very interesting fact that such favorable effect of concurrently using a nickel compound and manganese compound is particularly conspicuous when the oxidation is performed at relatively high temperatures, such as 160°C. and above. The present invention is based upon those discoveries.

Industrial practice of the oxidation reaction in accordance with the Witten process heretofore employed a cobalt compound as the catalyst, and was performed at 140°–160°C. The reason for adopting such low reaction temperatures is because at higher temperatures the formation ratio of low molecular decomposition products such as carbon monoxide and dioxide and tar-like by-product is increased, and consequently the yield of the object product drops rapidly in proportion to the rise in the reaction temperature. Additionally the side-production of colored impurities rapidly increases.

Surprisingly, however, when a nickel compound and manganese compound are used in combination as the catalyst according to the invention, the oxidation can be performed at such a wide temperature range as from 140°C. to 280°C. Particularly at 160°–250°C., especially 180°–230°C., a high temperature range seldom employed for the conventional Witten process, the oxidation of this invention can be practiced with advantage. More specifically, such high reaction rates as are never attainable with the conventional Witten process can be obtained, without the incidental side-formation of large quantities of decomposition products and high temperature-boiling substances as observed in the conventional Witten process.

Comparing oxidizing a mixture of MPT with PX at 220°C. in the presence of a combination catalyst comprising a nickel compound and manganese compound according to the invention, with the similar oxidizing operation at 150°C. using a cobalt compound as the catalyst as in the conventional Witten process, the former achieves a reaction rate as high as four times or more that of the latter. Furthermore, the object product (effective products) can be obtained at higher yield in the former.

Explaining the advantages in more concrete terms, when a cobalt catalyst heretofore employed almost exclusively in the Witten process is used, the oxidation reaction is performed at 140°–160°C. for the foregoing reasons. In that type of process, the yield of effective products ranges approximately from 85 to 88 %. When the reaction temperature is still elevated, however, the reaction rate increases, but the yield of the effective products decreases to approximately 81 to 83 %, and at 200°C., an abrupt drop to approximately 63 to 66 % is observed. Thus at such high temperatures, the reaction becomes industrially meaningless.

In contrast thereto, when a manganese compound and a nickel compound are used in combination as the catalyst according to the invention and the reaction temperature is raised to above 160°C., preferably above 180°C., the reaction rate is notably increased. For example, the yield of the reaction at 180°C. is improved over that of the reaction at 140°–160°C. by several percent. At such extremely high reaction temperatures as 200°–220°C., the yield of effective product can still be maintained at such high levels as 90 to 95 %, while attaining the drastically high reaction rate.

Such effect of a mixed catalyst comprising a manganese compound and nickel compound in the oxidation of MPT or a mixture of MPT with PX, particularly at relatively high temperatures, is completely unexpected and unpredictable.

As the starting material, MPT or a mixture of MPT with PX is used according to this invention. As the mixture, that ontaining no more than 80 % by weight, preferably no more than 60 %, of PX based on the total weight of the two, is used, In a preferred embodiment of the invention, such mixture of MPT with PX is oxidized according to the invention, the oxidation product is esterified with methanol, DMT is separated from the esterified product and recovered, fresh PX is added to the remaining reaction mixture containing MPT, and the resulting mixture is recycled to the oxidation step as the starting material to form DMT. In that embodiment, a suitable weight ratio of the MPT-containing reaction mixture remaining after the DMT separation to PX ranges from 0.7:1 – 1.5:1, particularly 0.9:1 1.3:1.

The oxidation reaction product obtained according to the invention contains, besides the object MMT or a mixture of MMT with PTA, such intermediate products as, for example, terephthalic acid, -methylbenzoyl alcohol

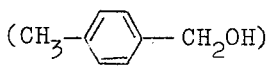

p-tolualdehyde

methyl p-formylbenzoate

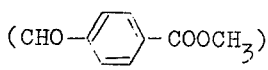

and p-formylbenzoic acid

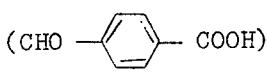

etc. When the reaction mixture is esterified with methanol, the free carboxyl groups in those intermediates are further methyl-esterified, to form oxidation and esterification intermediate products. Those oxidation or oxidation and esterification intermediates can be used as the starting material of the subject oxidation process together with the aforesaid MPT, to be converted to the object MMT or DMT. Therefore, the oxidation intermediate products which are ultimately convertible to MMT or DMT through the oxidation of this invention or the subsequent methyl-esterification, such as those intermediates described above, are covered by the term, object product, or effictive product, together with PTA or mixtures of PTA with MMT.

When the esterified product obtained by methylesterifying the oxidation reaction mixture resulting from the oxidation of this invention is, for example, distilled, not only DMT, but also MPT and above-described oxidation and esterification intermediate products are evaporated. Those can be separated from DMT simultaneously with, or separately from, the distillation, and can be readily recycled as the starting material. It is also possible to further recover DMT, MPT, and the oxidation and esterification intermediate products from the distillation residue obtained after the above distillation, by subjecting the residue to a later-described heat-treatment.

Thus, according to the present invention,

A. nickel metal and/or a nickel compound which is soluble in the reaction system (component A) and B. manganese metal and/or a manganese compound which is soluble in the reaction system (component B) are used in combination,
at such ratios that, converting the above components A and B respectively to nickel metal and manganese metal, the weight ratio of nickel metal to manganese metal should become 95:5 to 0.5:99.5, preferably 90:10 to 2:98, especially 80:20 to 20:80, as the catalyst.

When the weight ratio between the components A and B is outside the above-specified range, the reaction rate and the yield of effective product (object product) are decreased, and furthermore the oxidation product is colored.

The term, "reaction system" refers to not only the starting material, i.e., MPT or a mixture of MPT with PX, but also the aforesaid effective product formed by the oxidation, other by-products, as well as an optionally used liquid medium which is stable under the oxidation conditions of this invention, such as hydrocarbons including benzene, biphenyl, etc., and esters including methylbenzoate, etc. In short, the term signifies the entire reaction mixture.

The type of the liquid medium mentioned above is not critical, so far as it is liquid under the oxidation conditions of this invention, is inert (non-reactive) and stable under said conditions. Particularly those liquid media which are not esterified by methanol and are easily separable from DMT, MPT, and the intermediate products, are preferred.

As already stated, halogen compounds such as bromine or bromine compounds, as the promotor, or lower aliphatic monocarboxylic acid solvent, such as acetic, propionic, and monochloroacetic acids, etc., are not employed in the present invention, because they are unnecessary. Such halogen and halogen compounds are strongly corrosive to the reaction vessel. The lower aliphatic monocarboxylic acid also is corrosive to the reaction apparatus at the reaction temperatures employed in this invention, and furthermore is esterified to the corresponding methyl ester at the time of esterifying the effective product in the oxidation system with methanol to DMT or a mixture of DMT and MPT, causing a heavy economic loss because such methyl ester cannot be re-used as the solvent. Thus the use of halogen or a halogen compound as the promotor and/or the use of a lower aliphatic acid as the solvent, is both unnecessary and detrimental to the present invention.

According to the invention, as the component A, nickel metal and/or a nickel compound which is soluble in the reaction system is used, and as the component B, manganese metal and/or a manganese compound which is soluble in the reaction system is used. As the preferred nickel and manganese compounds, are nickel salts and manganese salts of the organic acids named below:

i. aliphatic carboxylic acids of 1 to 20 carbon atoms, e.g., formic, acetic, propionic, butyric, stearic, palmitic, oleic, lactic, and adipic acids;

ii. aromatic carboxylic acids of 7 – 20 carbon atoms, e.g., benzoic, toluic, isophthalic, and terephthalic acids; and iii. alicyclic carboxylic acids of 5 – 20 carbon atoms, e.g., naphthenic, cyclohexane-monocarboxylic, and m-ethylcyclohexane-monocarboxylic acids, etc. Furthermore, complexes such as acetylacetonate complex salts or methylacetoacetate, ethylacetoacetate, etc., salts of nickel or manganese, may also be used.

As the catalyst of this invention even the nickel and manganese compounds which are insoluble or difficulty soluble in the reaction mixture can be used with equal effect, as long as they become at least partially soluble in the reaction mixture under the reaction conditions of this invention. Examples of such compounds are the various inorganic compounds such as carbonates, oxides, and hydroxides, etc., of nickel and manganese. The preferred compounds are the nickel and manganese salts of the organic acids as mentioned in (i) through (iii), the most preferred being acetate, benzoate, toluate, and naphthenate of nickel and manganese, which are easily available and show good solubility in the reaction mixture.

Again the catalyst to be used in this invention may contain, besides the aforesaid components (A) and (B), a minor amount of a heavy metal or heavy metal compound such as iron, copper, chromium, etc., as the third component. The presence of such third component does not appreciably impair the catalytic activity of the two-component catalyst composed of (A) and (B). However, the amount of such third component should preferably be controlled to be not more than 20 % by weight, particularly not more than 10 % by weight, of the sum of nickel and manganese, all the components being calculated as the corresponding metals.

According to the invention, the composition of the catalyst is selected from the already specified range of the weight ratio between the components A and B, and the catalyst is suitably used at such a concentration as will provide, again calculating the catalytic components respectively as nickel metal and manganese metal, the total metal concentration in the whole reaction mixture of 0.002–0.5 % by weight, preferably 0.008–0.08 % by weight. At a catalyst concentration below the above lower limit, there occurs the tendency that the oxidation reaction rate and the yield of object product are reduced and side-production of colored impurities is increased. At the catalyst concentration higher than the above-specified upper limit, similarly the oxidation reaction rate and the yield of object product are reduced, side-formation of carbon monoxide and dioxide are increased, and also use of such a large quantity of the catalyst is economically disadvantageous.

At a reaction temperature below 160°C., furthermore, the oxidation reaction rate markedly drops, and particularly when MPT alone is used as the starting material, an industrially meaningful reaction rate cannot be achieved. On the other hand, if the temperature is raised above 250°C., the yield of the object product is lowered, and the side-formation of colored impurities is notably increased with further elevation in the reaction temperature. Thus, the optimum temperature range is from 180° to 230°C.

As the molecular oxygen or molecular oxygen-containing gas, besides pure oxygen, oxygen-containing gases formed by diluting oxygen with such inert gases as nitrogen, helium, argon, and carbon dioxide, may be used in this invention, air being the most easily available and economical oxidizing agent.

As the total reaction pressure, the range of from atmospheric to 250 kg/cm$^2$, and as the partial pressure of molecular oxygen, that of approximately from 0.2 kg/cm$^2$ to 50 kg/cm$^2$, are normally employed in this invention. At a partial pressure of molecular oxygen below 0.2 kg/cm$^2$, the oxidation reaction rate is lowered. Whereas, operations at a total pressure higher than 250 kg/cm$^2$ excessively increase the equipmental cost. The preferred pressure range is, in terms of partial pressure of molecular oxygen, 0.3–10 kg/cm$^2$, particularly 0.4–6 kg/cm$^2$.

In a preferred embodiment for practicing the oxidation reaction according to this invention, the catalytic components A abd B are used in combination at the ratio of, as converted respectively to nickel metal and manganese metal, 95:5 to 0.5:99.5 by weight, and the reaction is performed at a temperature within the range of 160°–250°C., particularly 180°–230°C. Whereby the effective product composed mainly of MMT or a mixture of MMT and PTA and containing very little colored impurities can be obtained at a high yield, at an extremely high reaction rate.

The esterification of the oxidation reaction product resulting from the subject method with methanol can be effected by any of heretofore known means. The heavy metal catalyst used for the oxidation may optionally be removed before the esterification.

For instance, the liquid oxidation product may be contacted with gaseous methanol as countercurrents, at high temperatures and pressures. In another preferred embodiment, the oxidation product is suspended in liquid methanol, and esterified in the presence of sulfuric acid catalyst.

As already stated, from such esterification product, DMT, MPT, and other effective oxidation and esterification intermediate products are separated, for example, by distillation. Simultaneously with, or separately from, the distillation, DMT is further isolated, and the remaining MPT and other effective intermediate products can be again used as the starting material of this invention, either by themselves or in combination with fresh p-xylene (PX).

The above-mentioned distillation is preferably performed under a reduced pressure of 50–200 mmHg, maintaining the bottom temperature of the distillation column at 200°–240°C., but at the highest not exceeding 250°C.

Furthermore, according to the invention, the distillation residue remaining at the bottom of the distillation column as the result of above distillation may be heated at 260°–400°C., particularly 280°–380°C., especially 300° – 370°C. (Hereinafter this procedure shall be referred to as the heat-treatment.) to allow the recovery therefrom of DMT, MPT, and other effective intermediate products of oxidation and esterification.

The distillation residue presumably is a mixture of various relatively high molecular compounds having boiling points higher than that of DMT, of which the structures are unknown, while the same may contain minor quantities of DMT, MPT, and other intermediate products. Upon the heat-treatment as above-described, various reactions such as decomposition and ester-interchange take place in the distillation residue, to convert as much as approximately 20 – 50 % by weight thereof to DMT, MPT, and the other effective intermediate products of the oxidation and esterification.

According to the invention, the distillation residue is particularly heated for the time (Q) which satisfies the expression (1) below to further increase the recovery of the effective product;

$$Q < (20)/(T-250) \qquad (1)$$

[in which T stands for the heat-treating temperature (°C.), and Q denotes the treating time (hr.)].

In a still more advantageous heat-treatment, the treating time (Q) is selected from the range defined by the expression (2) below, especially the expression (3) below:

$$(50)/(T-250) < Q < (150)/(T-250) \quad (2),$$
$$(100)/(T-250) < Q < (1000)/(T-250) \quad (3).$$

When MPT or a mixture of MPT with PX is oxidized according to the subject method, the color-free oxidation product can be obtained at higher reaction rate and yield than those of the oxidation using either the nickel compound or the manganese compound alone, or a cobalt compound which has been conventionally used in practicing the Witten process, as the catalyst.

The most important feature of the invention resides in the notably high reaction rate never attainable by the conventional Witten process. Because the equipment cost is extremely high for the industries to which the subject invention is applicable, this invention is indeed industrially valuable.

It is demonstrated by the following working examples of the present invention that appreciable improvement in the yield of effective product is achieved. DMT is recently produced on industrially very large scales. Therefore, the economical advantage of the present oxidation method which allows the recovery of a greater quantity of DMT from a fixed quantity of PX is extremely great. Furthermore, because the oxidation product from the subject method contains few color impurities and fluorescent impurities, high purity DMT can be easily obtained from said product.

Hereinafter the method of this invention will be more fully explained with reference to the working examples.

The abbreviations used in the Examples and Controls have the following definitions:

| | |
|---|---|
| MPT | methyl p-toluate |
| PX | p-xylene |
| DMT | dimethyl terephthalate |
| PTA | p-toluic acid |
| MMT | monomethyl terephthalate |
| MFB | methyl p-formylbenzoate |
| Ni | nickel metal |
| Mn | manganese metal |
| Co | cobalt metal |

EXAMPLE A

A 500-cc capacity stainless steel autoclave equipped with a reflux condenser, stirrer and gas inlet was charged with, for each run, 140 g of MPT, 60 g of PX, 1 g of MFB and nickel acetate and manganese acetates of the quantities indicated in Table 1. Air was blown thereinto at such a rate as would make the flow rate at the exit 1,500cc/min., and the system was reacted for 3 hours after the oxygen absorption started, under pressure of 10 kg/cm² (gauge pressure) and at temperature of 180°C., under high speed agitation. Thereafter the system was cooled and the product was withdrawn, which was then subjected to a gas chromatography or gravimetric analysis to determine the compositions of effective product and unreacted starting material contained therein.

i. Analyzing conditions of PTA, MMT, p-methylbenzyl alcohol, p-toluic acid, MFB, p-formylbenzoic acid, DMT, PX, and MPT:

The measurements were made under the below-specified conditions by means of gas chromatography.
  Liquid phase: neopentyl glycol succinate 2.5 %
  Column temp.: 80° – 220°C.
  Rate of temperature rise: 4°C./min.
  Carrier: diatomaceous earth (Chromosorb G AW DMCS), 100 – 120 mesh
  Carrier gas: N₂, 40 ml/min.

ii. Analyzing conditions of the compounds below:

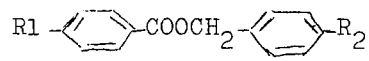

($R_1$ and $R_2$ being $CH_3$, $COOCH_3$, or $COOH$)

The sample was methyl-esterified with diazomethane, and then analyzed by gas chromatography under the following conditions.
  Liquid phase: Silicon DC 11 10 %
  Column temp.: 190°–290°C.
  Rate of temperature rise: 3°C./min.
  Carrier: diatomaceous earth (Chromosorb G AW DMCS) 100–120 mesh
  Carrier gas: N₂ 30 ml/min.

iii. Analyzing conditions of TA:

Two (2) grams of the oxidation product was dissolved in 100 cc of chloroform, and filtered. The cake was washed with 100 cc of methanol, dried in an oven having an inside temperature of 80°C., and the weight of cake was determined.

By means of those analyses the residual quantities of the unreacted starting materials, i.e., MPT and PX, and the yields of products were determined, and the yield of effective intermediate products of the oxidation and esterification (effective product being the compound of above-given items (i) through (iii), excepting MPT and PX) was calculated from the expression [I] below:

Yield of effective product (mol %)

$$= \frac{\text{formed effective products (mol)}}{\text{consumed [MPT(mol) + PX (mol)]}}$$

$$\times 100 \quad \text{...[I]}$$

Also the carbon dioxide and monoxide in the waste gas were determined, and the combustion loss by the oxidation reaction of this invention was calculated by the expression [II] below:

Combustion loss (mol %)

$$= \frac{\frac{1}{8} \times \text{formed } [CO_2(\text{mol}) + CO \text{ (mol)}]}{\text{consumed [MPT(mol) + PX (mol)]}}$$

$$\times 100 \quad \text{...[II]}$$

Further, in order to compare the colored impurities content, each unit amount of the oxidation product was dissolved in 40 cc of dimethylformamide and placed in a color comparison tube to determine the Hazen number (American Public Health Association Number).

For the comparison of formation rate of total effective acid component, the acid value of the oxidation product was determined by alkali titration, and the result was converted to per unit reaction time, to be shown as "acid value/hr.".

The acid value provides an effective norm for evaluating conversion of the oxidation reaction. Therefore, the "acid value/hr." becomes the norm of reaction rate. For example, if the total of feed in this Example A (MPT:140g, PX:60g) had been converted to the intended MMT (theoretical acid value: 311.1) and PTA (theoretical acid value: 411.8), the theoretical acid value would be 343. Therefore, by dividing the measured acid value by the theoretical acid value, the conversion can be surmised. Thus calculated conversions are also shown in Table 1.

In this example, the sum of the nickel metal and manganese metal employed, both as converted from nickel acetate and manganese acetate, was fixed to be 0.0597 % by weight to the total feed, throughout the runs, and only the weight ratio between the nickel and manganese was changed for each experiment.

The results are shown in Table 1 below.

In Run A-8, cobalt acetate alone was used as the catalyst, the other conditions being identical with those so far described. The results are concurrently given in Table 1.

EXAMPLE C

The same autoclave as employed in Example A was charged with 200 g of MPT, 1 g of MFB, and nickel acetate (30 mg as nickel metal) and manganese acetate (30 mg as manganese metal). Air was blown thereinto to provide a flow rate at the exit of 1500cc/min., under a pressure of 10 kg/cm$^2$(gauge pressure), under high speed stirring. The temperature was changed from 140°C. to 300°C.

The reaction was performed for the times indicated in Table 3 below, and the resulting yield of effective product, combustion loss, degree of coloring and acid value/hr. were determined. Incidentally, the yield of effective product and combustion loss were determined respectively by the expression [III] and [IV] below:

Table 1

| Run No. | | Catalyst Amount (as metal) | | Yield of Effective Product (mol %) | Combustion Loss (mol %) | Acid Value/hr | Conversion (%) | Degree of coloring (Hazen No.) |
|---|---|---|---|---|---|---|---|---|
| | | Ni(mg) | Mn(mg) | | | | | |
| A-1 | Control | 120 | 0 | 78.4 | 4.5 | 58 | 50.8 | 250 |
| A-2 | This Invention | 114 | 6 | 86.3 | 3.1 | 64 | 56.0 | 120 |
| A-3 | do. | 95 | 25 | 93.1 | 1.9 | 75 | 65.7 | 50 |
| A-4 | do. | 60 | 60 | 93.4 | 1.7 | 79 | 69.2 | 40 |
| A-5 | do. | 25 | 95 | 92.8 | 1.8 | 82 | 71.8 | 50 |
| A-6 | do. | 0.6 | 119.4 | 89.1 | 2.9 | 71 | 62.2 | 100 |
| A-7 | Control | 0 | 120 | 85.5 | 3.5 | 60 | 52.5 | 140 |
| A-8 | Control | Co 120 | 0 | 82.1 | 3.9 | 57 | 49.9 | 300 |

Example B

The same type autoclave as employed in Example A was charged with 140 g of MPT, 60 g of PX, 50 g of PTA, and nickel acetate and manganese acetate. Air was blown thereinto to provide a flow rate at the exit of 1,500 cc/min., and the reaction was performed for 2 hours under a pressure of 10 kg/cm$^2$ (gauge pressure) and a temperature of 220°C., under high speed stirring.

In all runs the nickel acetate and manganese acetate were charged in such quantities to make the sum of nickel metal and manganese metal as converted from the named compounds 0.0576 % by weight to the total feed, but the ratio between nickel and manganese was changed for each run. The yield of effective product, combustion loss, acid value/hr., and degree of coloring were determined in a manner similar to Example A, with the results as shown in Table 2. An identical experiment was performed except that cobalt acetate alone was used as the catalyst. The results are also given in Table 2 as B-10 (Control).

Yield of effective product (mol %)

$$= \frac{\text{formed effective product (mol)}}{\text{consumed MPT (mol)}} \times 100 \quad \text{...[III]}$$

Combustion Loss (mol %)

$$= \frac{\frac{1}{8} \times \text{formed } [CO_2(\text{mol}) + CO(\text{mol})]}{\text{consumed MPT (mol)}} \times 100 \quad \text{...[IV]}$$

Table 2

| Run No. | | Catalyst Amount (as metal) | | Ni:Mn (weight ratio) | Yield of Effective Product (mol %) | Combustion Loss (mol %) | Acid Value/hr. | Degree of Coloring (Hazen No.) |
|---|---|---|---|---|---|---|---|---|
| | | Ni(mg) | Mn(mg) | | | | | |
| B-1 | Control | 118 | 0 | 100:0 | 74.1 | 6.1 | 82 | no less than 500 |
| B-2 | This Invention | 112 | 6 | 94.9:5.1 | 83.9 | 3.9 | 113 | 300 |
| B-3 | do. | 106.2 | 11.8 | 90:10 | 88.9 | 2.8 | 121 | 200 |
| B-4 | do. | 94 | 24 | 79.7:20.3 | 93.0 | 1.7 | 127 | 120 |
| B-5 | do. | 59 | 59 | 50:50 | 93.6 | 1.6 | 118 | 50 |
| B-6 | do. | 24 | 94 | 20.3:79.7 | 92.4 | 1.8 | 115 | 70 |
| B-7 | do. | 2.4 | 115.6 | 2.0:98.0 | 87.1 | 2.7 | 115 | 75 |
| B-8 | do. | 0.6 | 117.4 | 0.5:99.5 | 85.1 | 2.9 | 114 | 80 |
| B-9 | Control | 0 | 118 | 0:100 | 78.4 | 3.5 | 110 | 150 |
| B-10 | do. | Co 118mg | 0 | — | 58.5 | 12.0 | 68 | no less than 500 |

Table 3

| Run No. | | Reaction Temp. (°C.) | Reaction Time (hr) | Yield of Effective Product(mol%) | Combustion Loss (mol %) | Acid Value/ hr. | Degree of Coloring (Hazen No.) |
|---|---|---|---|---|---|---|---|
| C-1 | Control | 140 | 10.0 | 88.6 | 2.5 | 8 | 60 |
| C-2 | Control | 150 | 8.0 | 88.8 | 2.4 | 18 | 60 |
| C-3 | This Invention | 160 | 5.0 | 90.9 | 2.3 | 30 | 50 |
| C-4 | do. | 170 | 4.0 | 91.2 | 2.2 | 41 | 50 |
| C-5 | do. | 180 | 3.0 | 92.1 | 2.2 | 59 | 50 |
| C-6 | do. | 200 | 2.0 | 90.5 | 2.7 | 104 | 40 |
| C-7 | do. | 220 | 1.5 | 91.8 | 2.7 | 136 | 50 |
| C-8 | do. | 230 | 1.5 | 91.2 | 3.0 | 134 | 60 |
| C-9 | do. | 240 | 2.0 | 89.5 | 3.3 | 125 | 90 |
| C-10 | do. | 250 | 2.0 | 89.2 | 3.6 | 118 | 120 |
| C-11 | Control | 260 | 2.0 | 82.1 | 4.5 | 108 | 200 |
| C-12 | Control | 280 | 2.0 | 78.2 | 5.4 | 98 | 300 |
| C-13 | Control | 300 | 2.0 | 68.0 | 6.3 | 82 | no less than 500 |

EXAMPLE D

A 500-cc capacity titanium autoclave of the same structure as that of the autoclave used in Example A was charged with 140 g of MPT, 60 g of PX, 2 g of MFB, nickel acetate (25 mg as nickel metal), and manganese acetate (25 mg as manganese metal). Air was blown thereinto to provide a flow rate at the exit of 1500 cc/min., under a pressure of 10 kg/cm² (gauge pressure), under a high speed stirring. The reaction was performed for the times indicated in Table 4, and the reaction temperature was changed from 150°C. to 300°C.

Thereafter the yield of effective product, combustion loss, degree of coloring, and acid value/hr. were determined similarly to Example A.

EXAMPLE E

The oxidation was performed under the conditions identical with those of Example A, using the same apparatus as employed in said Example, except that the reaction temperature was set to be 200°C., and the nickel acetate and manganese acetate as the catalyst were replaced by various other nickel compounds and manganese compounds. The amounts of the catalytic components were 50 mg each as converted respectively to nickel metal and manganese metal. The results were as shown in Table 5.

Table 4

| Run No. | | Reaction Temp. (°C.) | Reaction Time (hr) | Yield of Effective Product(mol%) | Combustion Loss (mol%) | Acid Value hr. | Degree of Coloring (Hazen No.) |
|---|---|---|---|---|---|---|---|
| D-1 | Control | 150 | 8.0 | 91.4 | 1.8 | 29 | 60 |
| D-2 | This Invention | 160 | 5.0 | 92.2 | 1.6 | 47 | 50 |
| D-3 | do. | 170 | 4.0 | 93.0 | 1.6 | 64 | 40 |
| D-4 | do. | 180 | 3.0 | 93.6 | 1.7 | 81 | 40 |
| D-5 | do. | 200 | 2.0 | 94.0 | 1.8 | 111 | 40 |
| D-6 | do. | 220 | 2.0 | 93.3 | 1.8 | 123 | 60 |
| D-7 | do. | 230 | 2.0 | 92.8 | 1.9 | 123 | 80 |
| D-8 | do. | 250 | 2.0 | 91.1 | 2.2 | 116 | 150 |
| D-9 | Control | 260 | 2.0 | 84.8 | 3.0 | 102 | 250 |
| D-10 | do. | 280 | 2.0 | 83.0 | 3.7 | 91 | 300 |
| D-11 | do. | 300 | 2.0 | 73.5 | 5.0 | 80 | no less than 500 |

Table 5

| Run No. | Ni Compound Type | Amount (mg) | Mn Compound Type | Amount (mg) | Yield of Effective Product(mol%) | Combustion Loss(mol%) | Acid Value/hr. |
|---|---|---|---|---|---|---|---|
| E-1 | nickel naphthenate | 50 | finely divided manganese metal | 50 | 93.7 | 1.7 | 112 |
| E-2 | nickel benzoate | 50 | manganese naphthenate | 50 | 93.5 | 1.8 | 112 |
| E-3 | nickel toluate | 50 | manganese carbonate | 50 | 93.9 | 1.8 | 111 |
| E-4 | nickel naphthenate | 50 | manganese acetylacetonate | 50 | 93.0 | 1.9 | 115 |
| E-5 | finely divided nickel metal | 50 | manganese formate | 50 | 92.8 | 1.9 | 110 |
| E-6 | nickel formate nickel lactate | 50 | manganese dioxide | 50 | 92.9 | 1.9 | 112 |

Table 5—Continued

| Run No. | Ni Compound Type | Amount (mg) | Mn Compound Type | Amount (mg) | Yield of Effective Product(mol%) | Combustion Loss(mol%) | Acid Value/hr. |
|---|---|---|---|---|---|---|---|
| E-7 | nickel benzoate | 50 | manganese benzoate | 50 | 93.8 | 1.7 | 113 |
| E-8 | nickel terephthalate | 50 | manganese butyrate | 50 | 93.7 | 1.8 | 113 |
| E-9 | nickel stearate | 50 | manganese isophthalate | 50 | 93.5 | 1.8 | 111 |
| E-10 | nickel hydroxide | 50 | manganese oleate | 50 | 93.0 | 1.9 | 113 |
| E-11 | nickel aceteate | 50 | manganese adipate | 50 | 93.9 | 1.7 | 112 |
| E-12 | nickel nitrate | 50 | manganese toluate | 50 | 93.1 | 1.9 | 110 |

EXAMPLE F

This Example is to demonstrate the superiority of the nickel-manganese catalyst of this invention over the conventional oxidation catalysts.

The same autoclave as employed in Example A was charged with 140 g of MPT, 60 g of PX, 5 g of PTA, 1 g of MFB, and the catalyst indicated in Table 6, and the reaction was performed for 2 hours at 230°C., and under a pressure of 10 kg/cm$^2$G, under high speed stirring, while air was blown thereinto at such a rate as would provide a flow rate of 1,500 cc/min. at the exit.

All the catalytic metals were used in the form of acetate. Single component catalysts were used, as converted to the corresponding metal, in the amount of 40 mg, and when two components were used concurrently, 20 mg of each component calculated as the metal was caused to be present. After the reaction, the yield of effective product, combustion loss, acid value/hr. and degree of coloring were determined similarly to Example A. The results were as shown in the following Table 6.

EXAMPLE G

In this example, the catalyst concentration in the reaction system was varied for each run.

The same autoclave as employed in Example A was charged with 140 g of MPT, 60 g of PX, 5 g of PTA, 1 g of MFB, and nickel acetate and manganese acetate of the amounts indicated in Table 7, and the reaction was performed for 2.5 hours at 200°C. and under a pressure of 10 kg/cm$^2$G, under high speed stirring, while air was blown thereinto at such a rate as would provide a flow rate of 1,500 cc/min. at the exit.

The ratio between nickel and manganese was maintained, calculated as respectively nickel metal and manganese metal, at 1:1 by weight, and the total metal concentration in the reaction mixture was changed from 0.002 to 0.1 % by weight.

After the reaction, the yield of effective product, combustion loss, and acid value/hr. were determined similarly to Example A. The results are given also in Table 7.

Operating conditions of all the runs in this Example are within the scope of this invention.

Table 6

| Run No. | | Type of Catalyst | Yield of Effective Product(mol%) | Combustion Loss (mol %) | Acid Value/hr. | Degree of Coloring (Hazen number) |
|---|---|---|---|---|---|---|
| F-1 | This invention | nickel and manganese | 93.0 | 1.9 | 128 | 70 |
| F-2 | Control | cobalt | 56.2 | 13.1 | 62 | no less than 500 |
| F-3 | do. | manganese | 76.0 | 4.3 | 113 | 250 |
| F-4 | do. | nickel | 71.8 | 7.2 | 84 | no less than 500 |
| F-5 | do. | manganese and cobalt | 80.5 | 3.1 | 115 | 100 |
| F-6 | do. | nickel and cobalt | 64.7 | 6.4 | 86 | no less than 500 |
| F-7 | do. | manganese and iron | 68.3 | 5.9 | 92 | no less than 500 |
| F-8 | do. | manganese and chromium | 71.4 | 6.2 | 91 | no less than 500 |
| F-9 | do. | manganese and tin | 66.6 | 6.0 | 95 | no less than 500 |
| F-10 | do. | manganese and copper | 60.3 | 6.3 | 82 | no less than 500 |

Table 7

| Run No. | Catalyst Concentration (as metal) | | Yield of Effective Product (mol %) | Conbustion Loss (mol %) | Acid Value/ hr. |
|---|---|---|---|---|---|
| | Ni(wt.%) | Mn(wt.%) | | | |
| G-1 | 0.001 | 0.001 | 88.3 | 2.5 | 83 |
| G-2 | 0.0025 | 0.0025 | 89.1 | 2.2 | 96 |
| G-3 | 0.004 | 0.004 | 90.8 | 1.8 | 102 |
| G-4 | 0.01 | 0.01 | 93.7 | 1.7 | 109 |
| G-5 | 0.02 | 0.02 | 93.4 | 1.8 | 103 |
| G-6 | 0.04 | 0.04 | 92.2 | 1.9 | 100 |
| G-7 | 0.06 | 0.06 | 90.5 | 2.1 | 97 |
| G-8 | 0.10 | 0.10 | 89.3 | 2.3 | 90 |
| G-9 | 0.25 | 0.25 | 88.4 | 2.6 | 81 |
| G-10 | 0.50 | 0.50 | 83.5 | 3.6 | 45 |

EXAMPLE H

The oxidation was conducted in the presence of a catalyst system containing, besides nickel and manganese, still another heavy metal.

The same autoclave as employed in Example A was charged with 140 g of MPT, 60 g of PX, 5 g of PTA, 1 g of MFB, nickel acetate (20 mg as nickel metal) manganese acetate (20 mg as manganese metal), and another metallic compound as indicated in Table 8. The reaction was performed for 2 hours at 210°C. and under a pressure of 10 kg/cm²G, under high speed stirring, while air was blown thereinto at such a rate as would provide a flow rate of 1,500 cc/min. at the exit.

All the third catalytic component metals were used in the form of acetate. After the reaction, the yield of effective product, combustion loss, acid value/hr., and degree of coloring were determined similarly to Example A. The results were as shown in Table 8.

Table 8

| Run No. | Type of Third Metal | Amount of Third Metal (mg, as metal) | Yield of Effective Product (mol %) | Combustion Loss (mol%) | Acid Value/ hr. | Degree of Coloring (Hazen) |
|---|---|---|---|---|---|---|
| H-1 | none | — | 93.5 | 1.7 | 116 | 50 |
| H-2 | chromium | 4 | 93.3 | 1.7 | 114 | 50 |
| H-3 | chromium | 8 | 93.0 | 1.8 | 114 | 50 |
| H-4 | chromium | 20 | 92.3 | 2.0 | 113 | 50 |
| H-5 | iron | 4 | 92.7 | 1.9 | 117 | 50 |
| H-6 | iron | 8 | 92.5 | 1.9 | 117 | 60 |
| H-7 | iron | 20 | 92.2 | 2.0 | 118 | 80 |
| H-8 | copper | 4 | 93.1 | 1.8 | 112 | 50 |
| H-9 | copper | 8 | 92.7 | 1.8 | 108 | 50 |
| H-10 | copper | 20 | 91.6 | 2.1 | 97 | 50 |

EXAMPLE I

The same autoclave as employed in Example A was charged with 120 g of MPT, 80 g of PX, 5 g of PTA, 1 g of MFB, nickel acetate (20 mg as nickel metal) and manganese acetate (20 mg as manganese metal), and the reaction was performed for 2.5 hours at 200°C. and under a pressure of 10 kg/cm²G, under high speed stirring, while air was blown thereinto at a rate to make its flow rate at the exit 1500 cc/min. The oxidation product was placed in a closed type autoclave (autoclave for esterification) equipped with a vertical stirrer, together with excessive methanol, and reacted for 2 hours at 270°C. in nitrogen atmosphere. After cooling the system, the esterified product was withdrawn, and the excessive methanol and the water formed by the reaction were driven off by heating. The remaining system was charged in a distillation apparatus equipped with a fractionating column, and distilled at 100 mmHg. Thus the system was separated into a first fraction composed mainly of MPT, a second fraction composed chiefly of DMT, and a waste of which the main component was a high boiling point, tar-like substance. The first fraction of the distillate was charged again in the autoclave for oxidation, and PX was added thereto to make the total amount of feed 206 g. Then the same amounts of nickel acetate and manganese acetate as employed in the initial oxidation were added, and the feed was oxidized under the identical conditions with those of the initial oxidation.

The oxidation product was esterified and distilled as in the first cycle.

The foregoing operation cycles were repeated 5 times, and the second fractions of distillate of all cycles were combined and recrystallized from methanol. Thus 592 g of high purity DMT was obtained. This means that 77.9 mol % of DMT to the consumed mol numbers of PX and MPT was obtained. Taking the DMT and other effective components such as PTA and MFB contained in the mother liquor of recrystallization, waste, and the first fraction of the fifth cycle, into consideration, the yield of effective product corresponds to 88.4 %.

EXAMPLE J

The same autoclave as employed in Example A was charged with 100 g of MPT, 1 g of MFB, 100 g of methyl benzoate (solvent), nickel acetate (20 mg as converted to nickel metal), and manganese acetate (20 mg. as manganese metal). The oxidation reaction was performed for 2 hours at 240°C. and under a pressure of 10 kg/cm²G, while air was blown into the system at a rate to make its flow rate at the exit 1,500 cc/min.

The product was charged into the same esterification autoclave as employed in Example I, and reacted with excessive methanol in nitrogen atmosphere, at 270°C. for 2 hours. The product was analyzed by means of gas chromatography. The consumed MPT was 567 mmols, formed DMT was 505 mmols, the formed MFB was 1 mmol, and the yield of effective product was 89.2 mol %.

EXAMPLE K

A mixture of PX and MPT was oxidized in liquid phase by air at 180°C. and under a pressure of 10 kg/cm²G in the presence of nickel acetate and manganese acetate, and an oxidation product composed chiefly of PTA and MMT was obtained. The residual amounts of the nickel and manganese in the oxidation product were, as converted to the respective metals, 0.028 wt.% and 0.028 wt.%.

The oxidation product was esterified with methanol to form an esterified mixture composed chiefly of MPT and DMT, which was subsequently distilled to effect isolation of DMT and substances having boiling points lower than that of DMT. Because the distillation residue still contained a substantial amount of DMT, the residue was further distilled until the effective components such as DMT and MPT were removed. The remaining distillation residue therefore contained substantially no effective component, i.e., not more than 1 % of DMT. The residual nickel and manganese in the residue were, when calculated as the pure metals, respectively 0.33 wt.% and 0.32 wt.%. 500 Grams of this distillation residue and 2,000 g of water were charged in a three neck flask, and maintained at 95°C. for 2 hours under stirring. Immediately thereafter the system was separated into two liquid phases. Thus an extraction residue containing, as calculated as the pure metals, 0.0021 wt.% of nickel and 0.0018 wt.% of manganese was obtained. 200 Grams of this residue was charged in a 300-ml capacity three neck flask, and heated at 330°C. for 3 hours under a reduced pressure, while the product was continuously distilled off as formed.

For comparison, the above series of reactions were repeated except that cobalt acetate alone was used as the oxidation catalyst. The thus obtained distillation residue contained only 0.9 % of DMT, and the remaining cobalt amounted to 0.274 wt.%, calculated as cobalt metal. The cobalt was extracted therefrom in the similar manner to the above, and an extraction residue containing 0.004 wt.% of cobalt calculated as the pure metal was obtained. The extraction residue was heat-treated under the identical conditions with those given above. The thus distilled effective components from the extraction residues are shown in Table 9 below:

Table 9

| Run No. | | Oxidation Catalyst | Residual Metal (wt.%) | DMT (g) | MPT (g) | MFB (g) | MMT (g) | PTA (g) | Total (g) | Effective Component Before Heat-treatment (g) |
|---|---|---|---|---|---|---|---|---|---|---|
| K-1 | This Invention | nickel manganese | 0.0021 0.0018 | 31.3 | 20.0 | 5.2 | 4.6 | 4.2 | 65.3 | 2.2 |
| K-2 | Control | cobalt | 0.004 | 6.9 | 2.2 | 0.5 | 0.6 | 0.5 | 10.7 | 1.8 |

EXAMPLE L

A distillation residue was obtained as in Example K, except that the oxidation catalyst was changed to nickel naphthenate and manganese naphthenate. The sole effective component in the residue was 0.6 % of DMT. The remaining amounts of nickel and manganese were, as calculated as the metal, both 0.26 wt.%.

For comparison, the Control in Example K was repeated except that cobalt naphthenate alone was used as the catalyst, and a distillation residue containing 1.2 % of DMT and 0.25 wt.% of cobalt, calculated as cobalt metal, was obtained.

The distillation residues were heat-treated similarly to Example K, at the temperature and for the time indicated in Table 10, with the results as also given in Table 10.

Table 10

| Run No. | | Oxidation Catalyst | Treating Temp.(°C) and Time (hr.) | DMT (g) | MPT (g) | MFB (g) | MMT (g) | PTA (g) | Total (g) | Effective Component Before Heat-treatment |
|---|---|---|---|---|---|---|---|---|---|---|
| L-1 | This Invention | nickel and manganese | 270 16 | 28.4 | 6.9 | 0.5 | 1.0 | 2.6 | 39.4 | 1.2 |
| L-2 | do. | | 310 4 | 35.2 | 16.1 | 2.8 | 0.9 | 3.6 | 58.6 | |
| L-3 | Control | cobalt | 270 16 | 4.9 | 0.8 | 0.2 | 0.2 | 0.2 | 6.3 | 2.4 |
| L-4 | do. | | 310 4 | 6.3 | 1.9 | 0.4 | 0.3 | 0.4 | 9.3 | |

We claim:

1. A process for the preparation of monomethyl terephthalate or a mixture thereof with p-toluic acid, which comprises oxidizing methyl p-toluate or a mixture thereof with no more than 80 % by weight of p-xylene by contacting the same with molecular oxygen or a molecular oxygen-containing gas in liquid phase, wherein the oxidation reaction is performed 1. in the presence of a catalyst consisting essentially of
   A. nickel metal, a nickel compound, or a mixture thereof which is soluble in the reaction system, and
   B. manganese metal, a manganese compound, or a mixture thereof which is soluble in the reaction system,
   the composition of the catalyst being such that the weight ratio of nickel metal to manganese metal becomes 95:5 to 0.5:99.5, when components (A) and (B) are respectively converted to nickel metal and manganese metal,
2. at a temperature within the range of 180° to 230°C., and in the substantial absence of bromine and bromine compound promoters and aliphatic monocarboxylic acid solvents.

2. The process of claim 1, wherein the catalytic components (A) and (B) are used in such quantities as will provide a total sum of the catalytic metals, as converted respectively to nickel metal and manganese metal, at the concentration of 0.002 – 0.5% by weight in the total reaction mixture.

3. The process of claim 1, wherein the catalyst is caused to be present in the oxidation reaction system at such quantities as will make the weight ratio of nickel metal to manganese metal from 90:10 to 2:98, when the components (A) and (B) are converted respectively to nickel metal and manganese metal.

4. The process of claim 2, wherein the catalytic components (A) and (B) are used in such quantities as will provide the total sum of the metals, calculated as converted respectively to nickel metal and manganese metal, at the concentration of 0.008 – 0.08% by weight in the total reaction mixture.

5. The process of claim 3, wherein the catalytic components (A) and (B) are caused to be present in the oxidation reaction system at such a ratio, as converted to the respective metal, to make the weight ratio of nickel metal to manganese metal within the range of 80:20 to 20:80.

6. The process of claim 1 wherein not more than 60% by weight of p-xylene is present.

7. The process of claim 1 wherein the nickel and manganese catalyst components are organometallic compounds having organic moieties derived from at least one of the group consisting of: aliphatic carboxylic acids having from 1 to 20 carbon atoms; aromatic carboxylic acids having from 7 to 20 carbon atoms; and alicyclic carboxylic acids having from 5 to 20 carbon atoms.

8. The process of claim 7, wherein the moieties are selected from at least one of the group consisting of acetate, benzoate, toluate, and naphthenate.

* * * * *